United States Patent [19]
Kotler et al.

[11] 3,727,819
[45] Apr. 17, 1973

[54] FEED MEANS FOR OPTICAL DISPLAY DEVICE AND CONTROL SYSTEM THEREFOR

[76] Inventors: Max Kotler, 2 Surry Lane, Montvale, N.J.; Frank E. Ravese, 1856 Marine Parkway, Brooklyn, N.Y.

[22] Filed: Oct. 20, 1971

[21] Appl. No.: 191,083

Related U.S. Application Data

[62] Division of Ser. No. 75,158, Sept. 24, 1970, Pat. No. 3,690,746.

[52] U.S. Cl. ............226/46, 226/66, 226/161, 352/194
[51] Int. Cl. ............................................G03b 1/22
[58] Field of Search..........226/46, 62, 66, 48, 226/161; 352/194, 196, 191

[56] References Cited

UNITED STATES PATENTS

| | | | |
|---|---|---|---|
| 3,567,092 | 3/1971 | Heinin | 226/66 |
| 3,637,124 | 1/1972 | Ueno | 226/62 |

*Primary Examiner*—Richard A. Schacher
*Attorney*—Maxwell James et al.

[57] ABSTRACT

A feed structure for a film projector is disclosed which is specially adapted to permit and inhibit feeding under the accurate and synchronized action of an electrical signal. The signal positions an electromagnetically actuated stop which coacts with the film feeding element so as to inhibit movement of that element only after the element has reached a predetermined position in its normal cycle of movement.

10 Claims, 6 Drawing Figures

FEED MEANS FOR OPTICAL DISPLAY DEVICE AND CONTROL SYSTEM THEREFOR

This application is a division of my application Ser. No. 75,158, filed Sept. 24, 1970, now U.S. Pat. No. 3,690,746 entitled "Feed Means for Optical Display Device and Control System Therefor".

The present invention relates to the construction and operation of a feed and control system for an optical displayer such as a motion picture or slide projector which is used in conjunction with a sound reproducer, both the optical displayer and the sound reproducer producing intelligence recorded on devices (e.g. films, tapes, records) fed therethrough. The sound reproducer device carries intelligence (a sound message, for example) and also carries control signals which are effective to control the feed both of the sound reproducer device and of the optical displayer device, and the optical displayer device carries intelligence (a series of pictures, for example) and also carries control signals which are similarly effective in feed control.

There are many instances where an optical displayer and a sound reproducer are used together. For example, one may wish to show pictures and have an audible explanation or commentary with respect to those pictures. In such cases the time duration for each of the individual pictures to be displayed may vary widely. It may be desired that some pictures remain on the screen for long periods of time because there is a great deal to be said about them, while other pictures should remain on the screen for a lesser period of time because there is less to be said about them. It may be desired that some pictures be projected rapidly in motion picture fashion, or that pictures be projected or exhibited without sound, the sound resuming at some appropriate time. It may further be desired, during the course of what is in effect an illustrated lecture, to cause a motion picture projector to operate at different speeds at different times during the lecture, thereby to produce the effect of slow motion or rapid motion.

One can, of course, have a person, an assistant to the lecturer, stand by the optical displayer and the sound reproducer and actuate them either in accordance with signals from the lecturer who is present or in accordance with some predetermined time schedule. This is cumbersome and subject to error. It is also possible to provide a specially programmed control assembly in the nature of a computer which will actuate the controls for the optical displayer and the sound reproducer in accordance with a program separately fed into the computer. This is obviously expensive, and adapted only for use with major display installations, such as those in a motion picture theater.

There is a need for a simplified system for controlling the feed of the optical displayer device and of the sound reproducer device in order to provide the desired flexibility of operation, which system requires no equipment other than what can be built into the optical displayer and the sound reproducer respectively, economically and without greatly increasing either the size or cost of the respective assemblies. It is also highly desirable that the control systems in question be actuated at the proper times without having to utilize any special separate programming equipment, with all of the problems of synchronization which the use of such separate equipment entails.

It is therefore the prime object of the present invention to devise a control system for an optical displayer and for a sound reproducer which permits flexibility of control of the feed in each of those assemblies by means which are simple, inexpensive and readily incorporatable into standard units which can be used as such either on a home or industrial scale.

It is another object of the present invention to devise such a control system in which no separate control programming is required, the device reproduced by the optical displayer and the device reproduced by the sound reproducer each carrying control signals in addition to intelligence, the control signals of each acting on the feed mechanisms for the optical displayer and/or sound reproducer, in order to produce the desired mode of operation.

It is yet another object of the present invention to provide on the tape or other device utilized by the sound reproducer a set of control signals which, when present in one form, will cause step by step operation of the optical displayer, the frequency of operation thereof being determined by the frequency of occurrence those individual control signals, the sound reproducer device also being capable of providing a different type of signal which will cause the optical displayer to function in a substantially continuous fashion, and which optionally will also cause the sound reproducer to cease its functioning.

It is a further object of the present invention to provide, in a system comprising an optical displayer and a sound reproducer, means for shifting control of operation of the system or of individual parts thereof from the device reproduced in the optical displayer to the device reproduced in the sound reproducer and back again, whereby great flexibility of control is provided.

It is yet another object of the present invention to devise a mechanism for adapting the usual type of claw feed in a motion picture projector so that it can readily be controlled by external control signals, such as those produced by the sound reproducer device or by some separate system, such as a timed pulse-producing electrical circuit.

It is yet a further object of the present invention to devise means for interrupting the normal feeding action of a cam-operated feeding claw in a motion picture projector and permitting that feeding claw then to operate in feeding fashion either intermittently or continuously as determined by external electrical signals.

To these ends, both the device reproduced by the optical displayer (e.g., a motion picture film) and the device reproduced by the sound reproducer (e.g., a sound tape) are provided, in addition to the intelligence which they normally carry (e.g. individual picture frames in the case of the motion picture film and reproducible magnetic variations corresponding to sound in the case of the sound tape), with a channel containing control signals. Means are provided for sensing these control signals, both those derived from the optical displayer device and those derived from the sound reproducer device, and causing those control signals to act and interact in order to determine the mode of operation of the optical displayer and the sound reproducer respectively. Thus the sound reproducer can be held dormant while the picture film is fed until the optical displayer is ready to show an appropriate picture, that readiness being made evident by the control signal on the picture film, control of the feeding of the picture film and of the sound tape thereafter being taken over by the sound reproducer, that control then being effected by the control signals on the sound tape. One type of control signal thus provided may cause the optical displayer to feed one picture at a time, with appropriate intervals between pictures as determined by the spacing of the control signals on the sound tape which continues to feed through the sound reproducer. Alternatively, or in addition at any particular time which is appropriate, a second type of signal can be produced by the sound tape which may be effective to cause the optical displayer to operate substantially continuously without any longer being under control of the sound reproducer, and if desired the sound reproducer itself can at that time, or at some subsequent time, be again made dormant. In such a situation the control will be shifted back to the optical displayer, the projector continuing to operate and the sound reproducer operating or not, as desired, until a new control signal is sensed on the motion picture film. That new control signal, like the first control signal from the optical displayer device, can then turn control back to the sound reproducer. This sequence can be continued for as long as necessary or desirable, thereby providing extreme flexibility in mode of operation of the optical displayer and the sound reproducer. The system is inherently self-synchronizing, because of the fact that control is shifted from one of the units to the other as determined by signals pre-located at appropriate positions on the reproduced devices themselves.

Synchronization must also occur between the control system and the actual feeding means in the optical displayer. If that were not done, the film might not be moved one complete frame during a given feeding cycle, with obvious optical dislocation of the projection system. To this end an interlock is provided between the feeding mechanism and the control mechanism, that interlock being effective to cause feed to take place strictly in accordance with the normal feed cycle.

Since the displayer is usually an optical device, the means for producing the control signals associated therewith is most conveniently optical in character, and similarly since the sound reproducer is usually an electromagnetic device the means for producing the control signals is most conveniently electromagnetic in character. Simple and reliable electrical circuitry is employed to convert the presence or absence of those control signals into appropriate electrical actuations which effect the desired control functions. This can very readily be accomplished by the use of simple and reliable relays to carry out the control functions and by the use of an electromagnet to actuate the feed mechanism or at least that portion thereof which determines whether feed occurs or not.

The entire system is so simple, both mechanically and electrically, that it can be incorporated into conventional optical displayers such as motion picture projectors and sound reproducers such as magnetic tape reproducers without appreciably adding to their cost or size. The thus modified projectors and reproducers can be used independently in normal fashion, and all that is necessary in order to use them in cooperative control fashion such as is here specifically disclosed is to utilize reproducible devices (film and tape) which have appropriate control signals thereon and to energize the simple control circuits which are present in the individual units of equipment. Thus the system of the present invention is very well adapted for use with home equipment or other small and readily portable equipment, and is not limited to, although it can well be used in, fixed installations such as theaters and auditoriums.

To the accomplishment of the above, and to such other objects as may hereinafter appear, the present invention relates to the construction and arrangement of feed and control systems for optical displayers and sound reproducers, as defined in the appended claims and as described in this specification, taken together with the accompanying drawings, in which:

INTRODUCTION

Figures 1, 2, 3:
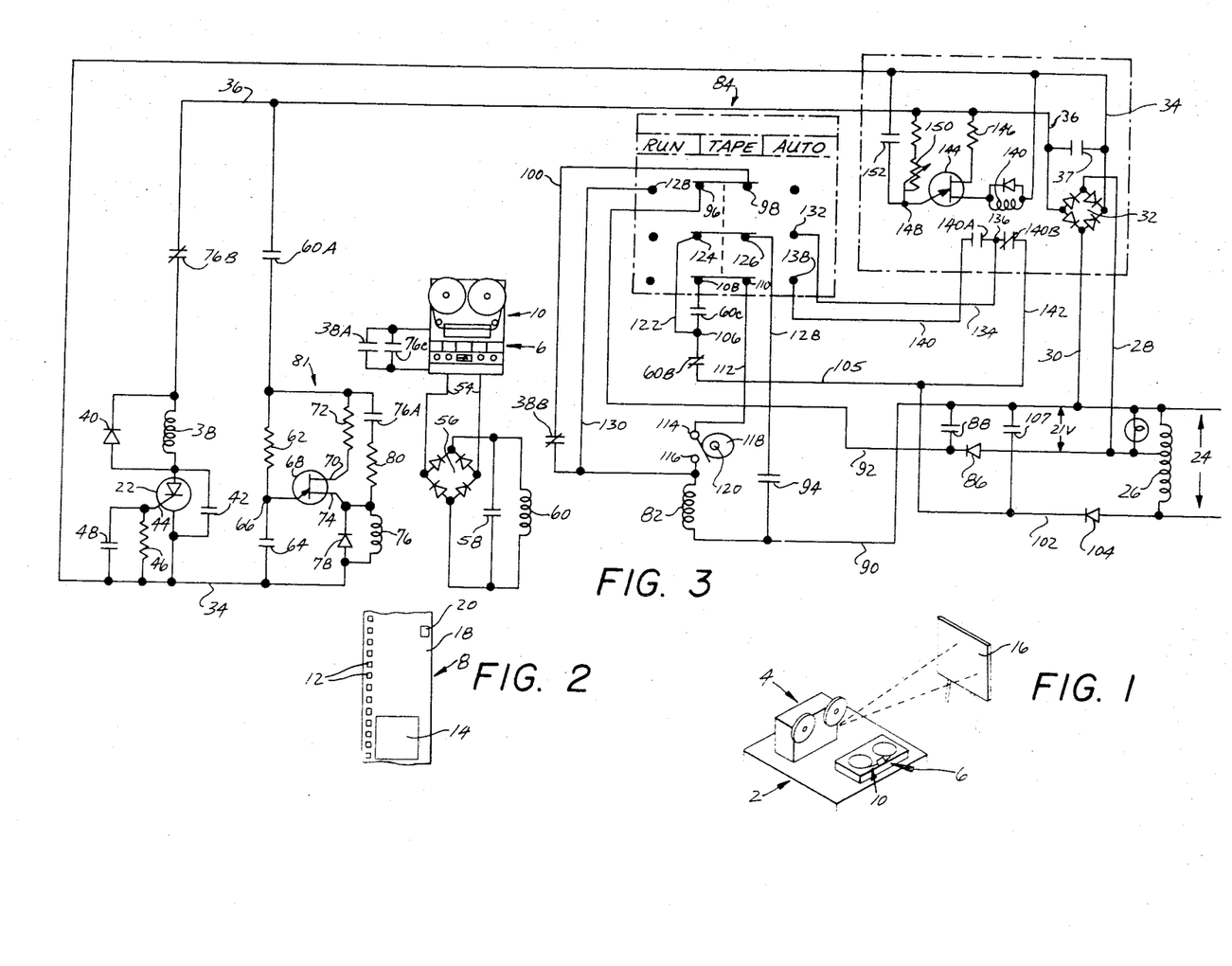
FIG. 1 is a three-quarter perspective semi-schematic view showing an optical displayer (motion picture projector) and sound reproducer (tape recorder) used together.
FIG. 2 is a fragmentary plan view of the motion picture film (optical displayer device) which may be used in conjunction with the present invention, the figure showing a portion of that film which carries both picture intelligence and means for producing a control signal.
FIG. 3 is a circuit diagram of a preferred embodiment of the control system of the present invention showing the interrelation between the optical displayer and sound reproducer.

Broadly considered, what is involved here is the use of two different intelligence-producing assemblies each acting upon a device to be reproduced, with those devices having control signals derived therefrom as well as intelligence signals, and with the control of either or both of the assemblies being effected by one or the other or both of those control signals. When mention is made of "control signals" any type of element for producing such signals could be used, whether optical, magnetic, or even mechanical. When mention is made of "intelligence reproduction" the term "reproduction"is used broadly to represent either literal reproduction, as the reproduction of sound from magnetic variations on a tape, or figurative reproduction such as is involved in the visual display of something to be carried on a slide or a motion picture film. Broadly considered, the system of the present invention is adapted to coordinate the operation of any two intelligence-producing assemblies adapted to be used together. For purposes of illustration, and in order to make the explanation of the operation of the system of the present invention more understandable, one of those intelligence-producing assemblies is described as an "optical displayer," such as a slide projector, motion picture projector, or projector or displayer of visual elements of any type, whether produced by optical means or by other means (e.g. videotape). The other intelligence-producing assembly is described as a "sound reproducer" such as an assembly or unit which is capable of reproducing signals formed on an appropriate device, such as a sound record, sound tape, the optical sound reproductions on motion picture film and the like. In the form here specifically utilized for illustrative purposes, the optical displayer is a motion picture projector of relatively conventional type, such as that disclosed in my U.S. Pat. No. 3,524,573, of Aug. 18, 1970, entitled "Intermittent Film Transport Means for Motion Picture Projector" and assigned to the assignee of this application. Because of the facility with which self-threading of such projector can be used in connection with the control system of the present invention, the projector or "optical displayer" here specifically illustrated is of the self-threading type. The sound reproducer here shown is a conventional electromagnetic reproducer capable of co-acting with magnetically moving tape which is moved past a reproducing head as it unwinds from one reel and is wound onto another reel, all as is conventional. It will be understood that these assemblies are disclosed and described by way of exemplification and not by way of limitation, and that the terms "optical displayer" and "sound reproducer" are in their broader senses meant to include any two intelligence-producing assemblies. In FIG. 1, there is shown on a table 2 a motion picture projector 4 and a sound reproducer 6, the motion picture projector operating in conjunction with a reproducible device in the form of motion picture film 8 (see FIG. 2) and the sound reproducer 6 operating in conjunction with a reproducible device in the form of sound tape 10 (see FIG. 3). The motion picture film 8 is provided along one side with a row of sprocket holes 12 for cooperating with a conventional type of claw feed, hereinafter described more in detail. It also carries a plurality of individual frames 14 of pictures which are adapted, in accordance with usual motion picture projection operation, to be moved one after the other into an optical projection position, the individual frames then stopping and being projected onto the screen 16. If the individual frames 14 are projected with relatively long time intervals inbetween, they will be visible on the screen 16 as individual stationary pictures. If they are projected rapidly enough one after the other, they will appear on the screen 16 in the form of continuous motion pictures.

The motion picture film of FIG. 2 is provided, along its right-hand edge as viewed thereon, with a control track, that track being here shown as consisting of an opaque area 18 separated by transparent areas 20. It is a matter of arbitrary conceptualization whether the opaque areas 18 be considered as producing a control signal and the transparent areas 20 are considered as not producing the control signal, or vice versa. For purposes of explanation the transparent areas 20 will be here described as being effective to produce a control signal, while the opaque areas 18 will be here described as being ineffective to produce such a signal. Thus on the motion picture film 8, the frames 14 represent intelligence and constitute intelligence signals capable of being "reproduced" (which term includes displaying) by the projector 4, while the transparent areas 20 along the right-hand edge of the film 8 constitute optical means capable of being "reproduced" in order to create control signals.

The sound reproducer device defined by the tape 10 likewise contains two rows or channels, one of those rows or channels being magnetically modified in conventional fashion in order to produce a sound track, the other channel being magnetically modified so as to produce control signals which, as here specifically disclosed for purposes of illustration, may be electromagnetically sensed and reproduced in the same fashion and by essentially the same circuitry as is employed for the reproduction of the intelligence signals on the tape, that is to say, those signals adapted to create actual sound when passed through suitable electrical apparatus.

CONTROL CIRCUIT DESCRIPTION

In the optical displayer 4, the control track defined by the opaque areas 18 and the transparent areas 20 is adapted to cooperate with a photocell 22, here shown as a light-sensitive silicon controlled rectifier. A suitable AC source 24, such as the normal 60 cycle power line, is connected through autotransformer 26 and lines 28 and 30 to a full-wave rectifier 32 the output of which is fed to lines 34 and 36 which may be considered respectively as negative and positive DC lines. A capacitor 37 may be connected across the lines 34 and 36 to filter out any ripple from the output of the rectifier 32. The photocell 22 is connected across the lines 34 and 36 in series with a projector stop relay winding 38. A rectifier 40 may be connected across the relay winding 38, and capacitor 42 may be connected across the photocell 22. The electrode 44 of photocell 22 may be connected to the line 34 by means of a resistor 46 and a capacitor 48 connected in parallel.

The sound reproducer 6 is provided with a circuit which, when closed, causes the tape 10 to be fed therethrough. That circuit can be manually preliminarily energized, but it also includes a pair of normally open relay contacts 38A and 76C which are connected in parallel. One or the other of those contacts must be closed if the tape 10 is to be fed through the reproducer 6 when the reproducer is conditioned to operate under the automatic control here described. The tape recorder has a conventional intelligence output circuit, not here shown, and it also has a control signal output circuit 54. The control signals produced by the control tracks of the tape 10 may be in the form of a high frequency signal having a frequency, for example, of 1,000 Hertz. That signal is fed to the full-wave rectifier 56, and the DC output thereof, smoothed by capacitor 58, is fed to the tape control relay winding 60.

Connected across the lines 34 and 36 are a resistor 62 and a capacitor 64 in series. The point 66 between those two circuit elements is connected to the base of a uni-junction transistor 68. The output electrode 70 of the transistor 68 is connected to line 36 by a resistor 72, while the output electrode 74 of the transistor 68 is connected to line 34 via holding relay winding 76. A rectifier 78 may be connected across the winding 76.

The winding 76 is connected to the line 36 via resistor 80 and relay contacts 76A. The circuit thus described is a time delay circuit generally designated 81. When energized for a period of time sufficient to charge the capacitor 64, the unijunction transistor 68 will be rendered conductive, thus energizing the holding relay winding 76. The relay contacts 76A are adapted to be closed when the winding 76 is energized, thus acting as a means for holding the winding 76 energized once it has become energized.

A normally closed set of contacts 76B are connected between the line 36 and the projector stop relay winding 38. These contacts are adapted to be opened when the holding relay 76 is energized. A normally open set of contacts 60A are connected between line 36 and the time delay circuit 81, and those contacts are adapted to be closed when the tape control relay winding 60 is energized. The normally open contacts 38A are adapted to be closed when the relay winding 38 is energized, and the normally open contacts 76C are adapted to be closed when the winding 76 is energized.

(In general, all relay contacts will be given the same number as the relay winding which is designed to actuate them, each set of contacts of a given relay being distinguished from the other contacts actuated by that relay winding by means of different letter designations.)

The remainder of FIG. 3 discloses control circuitry which forms a part of the projector or optical displayer 4. When the projector is to be under automatic control, it will normally be in a condition in which, even though the projector is energized and manually turned on, its feeding mechanism for feeding the film 8 therethrough will be prevented from operating. That feeding mechanism will be released to operate only when the solenoid winding 82 is energized. The projector is provided with an operation mode control switch generally designated 84 having three modes, "Run," "Tape," and "Auto." In "Run" the projector will operate continuously. In "Tape" the projector will operate in accordance with combined projector and reproducer control in accordance with the present invention. Switch 84 is therefore shown in its "Tape" mode. In "Auto" the projector will be operating at a speed determined by manual control.

The AC output from the autotransformer 26, between the lines 28 and 30, is rectified at 86 and smoothed by capacitor 88, and then applied across lines 90 and 92. Line 90 is connected to one end of the winding 82 and to one side of a capacitor 94. Line 92 is connected to point 96, where the switch 84, when in "Tape" mode, makes connection to terminal 98 which is in turn connected to line 100. Line 100 is connected, via normally closed relay contact 38B, to the other end of winding 82. Line 102, with rectifier 104 therein and with capacitor 107 between itself and line 90, is connected by line 105 and normally closed relay contacts 60B, to point 106. Normally open relay contacts 60C connect point 106 to switch terminal 108, the switch 84 when in "Tape" mode connecting that terminal to switch terminal 110, which is in turn connected to line 112. Line 112 is connected to switch terminal 114, the other terminal 116 of that switch being connected to the upper end of the solenoid winding 82. Switch 114, 116 is normally open and is adapted to be closed by means of cam 118 mounted on shaft 120. As will be seen hereinafter, rotation of shaft 120 is synchronized with the action of the shaft 206 which actuates the mechanical feeding mechanism, the switch 114, 116 being momentarily closed during that operation of the feeding mechanism cycle when the feeding element or claw 200 is in the return or idling part of its cycle of operation. In this way it is ensured that when the claw 200 is released in accordance with the control signal it will engage the film and move it for a distance corresponding to a complete frame. Point 106 is connected by line 122 to switch terminal 124, that terminal being connected by switch 84, when in "Tape" mode, to switch terminal 126 which is in turn connected by line 128 to the upper end of capacitor 94.

SYSTEM OPERATION

The operation of the optical displayer 4 and the sound reproducer 6 will be now described, it being understood that the mode switch 84 of the projector is set to the "Tape" position, the projector is plugged in so that it is connected to the AC energy source 24, the sound reproducer 6 is plugged in and energized, and its feeding circuit is provisionally energized, needing only the closing of the relay contacts 38A or 76C in order to start the feed of the tape 10. Means are provided in the projector (hereinafter described) for preventing energization of the photocell 22 when the projector is first energized. Hence projector stop relay winding 38 is not energized and the relay contacts 38B are in their normally closed position. Hence a circuit may be traced from positive line 90 through the solenoid winding 82, closed relay contacts 38B, line 100, switch terminals 98 and 96, and line 92 to a less positive section of the energy source. Thus the solenoid winding 82 is energized and the projector feed is permitted to operate.

The projector feed will continue to operate, and the reproducer feed will continue to be disenabled, until such time as the photocell 22 is energized. When, as is here specifically illustrated, the projector 4 is of the self-threading type, the motion picture film 8 will be inserted thereinto and it will be fed therethrough in self-threading fashion. The transparent section 20 on the film 8 is designed to become operatively associated with the photocell 22 at an appropriate time in the threading of the film into the projector, as when the threading is complete and the film is ready for projection, that is to say, just before the first intelligence or picture frame 14 comes into operative projection position. When the photocell 22 is illuminated, it becomes conductive and projector stop relay 38 becomes energized. This opens the contacts 38B and breaks the circuit to the solenoid winding 82. This in turn causes the projector feed to stop. At the same time, the normally open contacts 38A associated with the feed control circuit for the sound reproducer 6 will close, and hence the feed system for the sound reproducer 6 will become enabled and the tape 10 will commence to be fed through the sound reproducer 6, thereby producing appropriate sound output.

The projector will remain in standby condition, with its film 8 being stationary and not being fed, until an appropriate control signal emanates from the tape 10, is rectified at 56, and energizes the tape control relay winding 60. Prior to this moment, and after the relay windings 38B had opened to break the circuit to the solenoid coil 82, the lines 90 and 102 were connected across the capacitor 94 via line 105, relay contacts 60B, line 122, switch contacts 124 and 126, and line 128. This charges the capacitor 94. When, then, the tape control relay winding 60 is energized, the relay contacts 60B will open, disconnecting capacitor 94 from the energy source 24, and the relay contacts 60C will close, connecting the capacitor 94 to the upper end of the solenoid winding 82 via the switch 114, 116. If that latter switch becomes closed during the time that the tape control relay winding 60 is energized, then the solenoid winding 82 will become energized and that will permit the feed system of the projector 4 to be enabled. Ordinarily, when the projector 4 is a motion picture projector, a certain length of time is provided for a feed cycle. If step by step operation of the projector feed is desired, then the control signal from the tape 10 will have a time duration less than that needed for a full feed cycle of the projector, and as a result the relay contacts 60B and 60C will resume their normal condition before the feed cycle has been completed. This will disconnect the energy source from the solenoid winding 82 and cause the latter to become deenergized. Means are provided so that the feed cycle of the projector can continue until the cycle is over, but the occurrence of subsequent feed cycles is inhibited until such time as the solenoid winding 82 is again energized. By placing suitable control signals at appropriate positions along the length of the sound tape 10, individual frame feeding of the motion picture film 8 thus can be produced at times appropriate to the particular sound intelligence being reproduced at any given moment.

Each time that the tape control relay 60 is energized the relay contacts 60A are closed. This causes energization of the time delay circuit 81 connected thereto and the capacitor 64 starts to charge. However, the size of that capacitor 64 is such that it will not charge sufficiently to render the transistor 68 conductive in the period of time comparable to a single feed cycle of the projector. Each time that the tape control relay winding 60 is deenergized, the charge previously placed upon capacitor 64 will leak off therefrom. Thus when individual short control signals are produced by the tape 10 the holding relay winding 76 is not energized. However, if a control signal of longer duration emanates from the reproducer 6 (for example, a signal whose length in terms of time exceeds 20 milliseconds) the capacitor 64 will charge sufficiently so as to render the transistor 68 conductive and energize the holding relay winding 76. That energization closes the relay contacts 76A, thus holding the winding 76 energized for so long as the control signal emanates from the reproducer 6, that is to say, for so long as the tape control relay winding 60 remains energized and thus keeps the relay contacts 60A closed.

While the relay winding 60 is thus energized, the relay contacts 60B are opened and relay contacts 60C are closed and the solenoid winding 82 thus becomes energized through discharge of the previously charged capacitor 94. That will not keep the solenoid winding 82 energized an extended period of time. However, energization of the holding relay winding 76 opens the normally closed contacts 76B and thus deenergizes the projector stop relay 38 even if the photocell 22 may be illuminated and thus conductive. When the projector stop relay winding 38 becomes deenergized, the relay contacts 38B close, and thus constant energization of the solenoid winding 82 results, producing continuous feed of the projector 4.

If now the long duration control signals from the tape 10 stop, the tape control relay winding 60 becomes deenergized. This causes the relay contacts 60A to open, deenergizing the holding relay winding 76, permitting the relay contacts 76A to open, and permitting the relay contacts 76C to open. Since the projector stop relay winding 38 had previously been deenergized, the relay contacts 38A are likewise open, and hence feed of the tape 10 through the reproducer 6 stops. However, because the projector stop relay winding 38 is deenergized, the contacts 38B remain closed, the solenoid winding 82 remains energized constantly, and projector feed continues. It will continue until the next control signal emanates from the projector device, the motion picture film 8. When the next transparent area 20 comes into operative registration with the photocell 22, that photocell will become conductive, the winding 38 will become energized, the contacts 38B will open, disconnecting the winding 82 from the power source 24, thereby causing projector feed to stop, the relay contacts 38A will close, reproducer feed will resume, and control of the joint operation of the reproducer and the displayer will again be carried out by the control signals from the tape 10 in the manner previously described.

Thus, through cooperative action between control signals carried by the optical displayer device 8 and the sound reproducer device 10 respectively, complete flexibility in operation of the optical displayer 4 and sound reproducer 6 is effectuated. The sound reproducer 6 will not start until a signal comes from the optical displayer 4. The sound reproducer 6, through its control signals, will then control the operation of the feed of the optical displayer 4, causing that feed to occur either in step by step fashion, at any desired frequency and with any desired time interval between steps, or in continuous fashion. The control can be such that the reproducer feed is stopped while the projector feed continues, an appropriate signal from the projector then turning control back to the sound reproducer after the latter has been restarted.

Through judicious choice of the particular control signals and through judicious shifting of the control from optical displayer to sound reproducer and back again, all accomplished through control signals integrally formed on the optical displayer device 8 and the sound reproducer device 10 respectively, automatic synchronization is achieved with the utmost flexibility in the type of control produced.

"RUN" AND "AUTO" MODES

When the mode switch 84 on the projector is in the "Run" position, the terminal 96 will be connected to terminal 128, which is in turn connected by lead 130 to the upper end of the solenoid winding 82. The switch terminal 96 is connected to line 92, while the lower end of the solenoid winding 82 is connected to line 90. The potential difference between lines 90 and 92 provides for constant energization of winding 82, thereby permitting projector feed to take place without interruption.

When the mode switch 84 on the projector is in "Auto," terminal 126 is connected to terminal 132, that in turn being connected by line 134 to point 136. Switch terminal 110 will at the same time be connected to switch terminal 138, which is in turn connected by line 140 to normally open relay contacts 140A, those contacts connecting line 140 to point 136. Normally closed contacts 140B connect point 36 to line 102 via line 142. The relay contacts 140A and 140B are controlled by relay winding 140 which is connected between line 34 and one output terminal of transistor 144. The other output terminal of that transistor is connected by resistor 146 to line 36. The control terminal of transistor 144 is connected to point 148 between variable resistor 150 and capacitor 152 connected in series across the lines 34 and 36, that capacitor-resistor network constituting a time delay network determining the length of time that it takes to charge the capacitor 152 to a potential such as to render the transistor 144 conductive. Whenever the transistor 144 becomes conductive the relay winding 140 becomes energized, and when that occurs a leakage path is provided across the capacitor 152. The setting of the resistor 150, which is manually accomplished, will determine the frequency with which the relay winding 140 is energized. The action of the relay winding on the relay contacts 140A and 140B is similar to that previously described with respect to the relay contacts 60C and 60B. They alternately connect the energy storage means defined by the capacitor 94 between the energy source 24 and the solenoid winding 82. Thus when the mode switch 84 on the projector is in its "Auto" position, step by step feed by the projector will be effected, through step by step energization of the solenoid winding 82, at a frequency determined by the setting of the resistor 150. Thus in the "Auto" mode the speed of operation of the projector feed can be manually determined and controlled.

PROJECTOR FEED STRUCTURE

Figure 4:
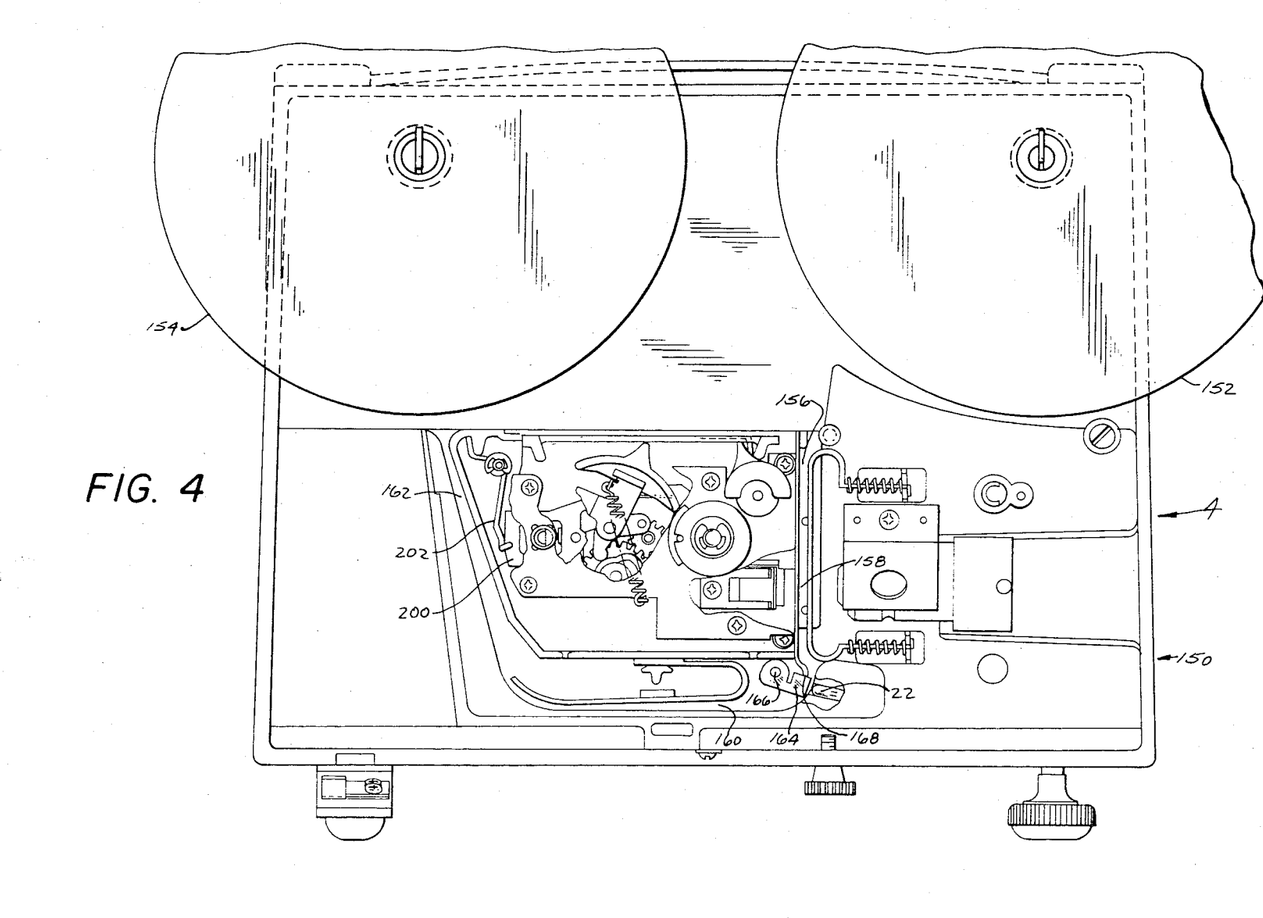
FIG. 4 is a fragmentary side elevational view of one embodiment of a motion picture projector adapted to be used in conjunction with the present invention.
Figure 5:
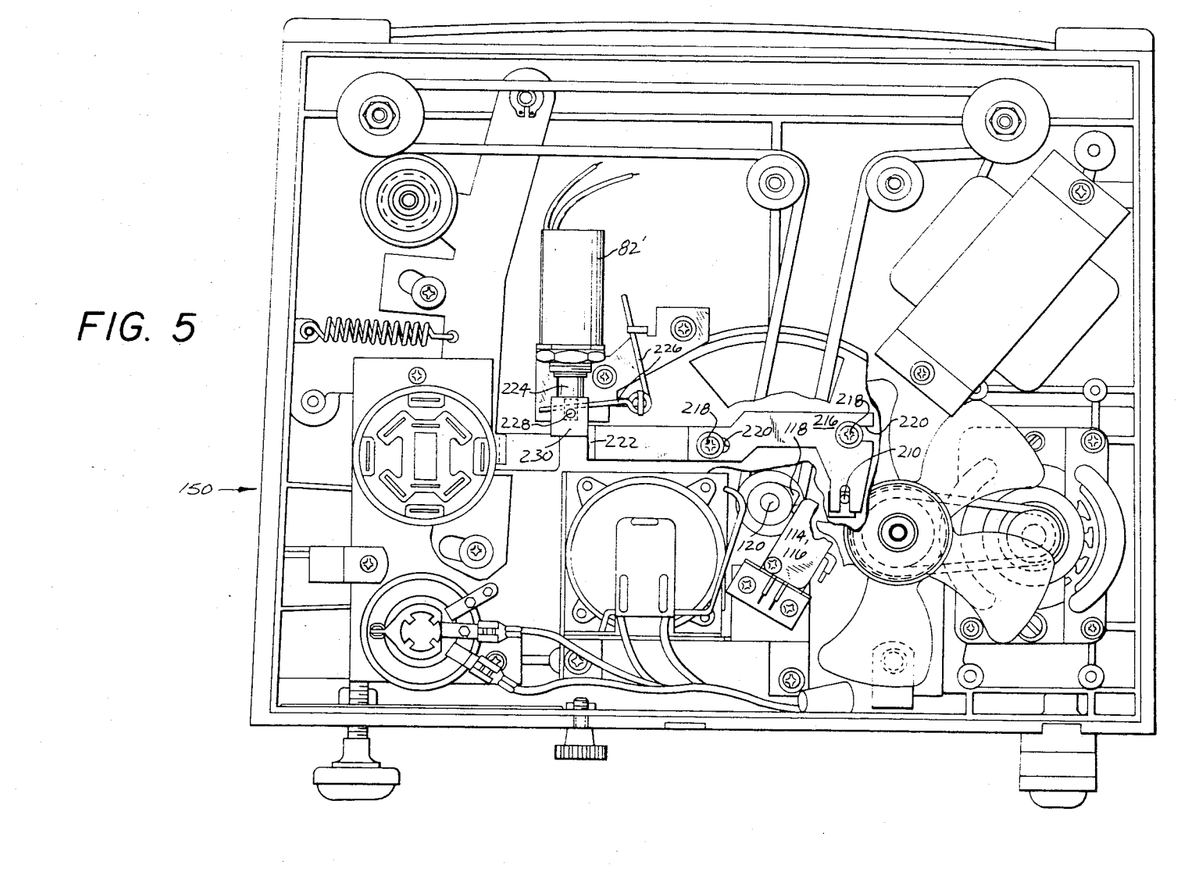
FIG. 5 is a side elevational view of the motion picture projector of FIG. 4 taken from the side thereof opposite that shown in FIG. 4.
Figure 6:
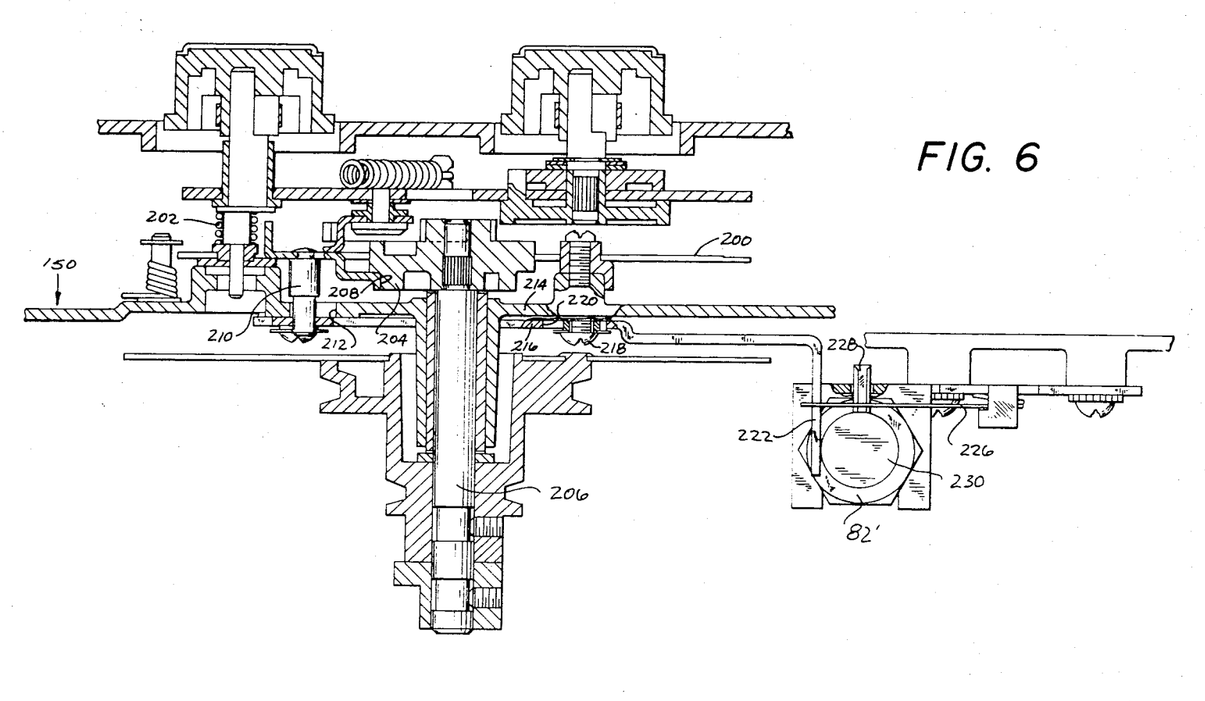
FIG. 6 is a developed cross-sectional view showing the claw-feeding structure, the drive means therefor, the shutter means associated therewith, and the structure employed for inhibiting and permitting feeding movement of the feeding claw.

FIGS. 4, 5 and 6 disclose projector structure which is in general known and conventional but which has been modified in certain respects in order to adapt it for use in connection with the control system of the present invention.

Having reference first to FIG. 4, the projector 4 comprises a chassis generally designated 150 on which are mounted a supply reel 152 and a take-up reel 154. The film 8 is adapted to be fed from the supply reel 152 down into channel 156, past the projection station 158, then along channels 160 and 162 to the take-up reel 154. The photocell 22 may be mounted in the chassis 150 at a point between the channel 158 and the channel 160. It may have a separate light source associated therewith or, as here specifically disclosed, it may be affected by the ambient light coming from the bulb which is used for projection purposes. As the system of FIG. 3 has been described, a control signal for energizing the projector stop relay 38 is constituted by the presence of light, as indicated by the transparent area 20. In order to prevent the photocell 22 from being affected by ambient light before the leading end of the film 8 reaches it, a gate 164 is pivotally mounted at 166 and is spring-urged (by means not explicitly shown) to rotate in a counterclockwise direction as viewed in FIG. 4 so as to come up against the stop 168. When in this position, it obscures photocell 22 and prevents light from reaching it. When the leading end of the film 8 is fed down through the channel 156 it will engage the gate 164 and cause it to pivot in a clockwise direction, the end of the film then moving over the photocell 22. Since that photocell will be aligned with the control track on the film 8, and since that control track will at least initially be opaque as at 18, the photocell 22 will remain unenergized by light, and therefore nonconductive, until such time as the first transparent area 20 on the control track comes into operative registration therewith. The function of the gate 164 is to prevent the photocell 22 from becoming conductive prior to the time that the film 8 reaches it; once the film 8 reaches it then the control track on the film takes over control.

Referring now particularly to FIGS. 5 and 6 for details of the feeding mechanism and of the means for driving and preventing the enabling of that mechanism, the actual feeding element may comprise a feeding claw 200 of conventional construction. This claw is mounted for sliding and swinging movement, and is provided with a spring 202 (see FIG. 4) adapted to urge it to the right to film-grasping position. An eccentric 204 is mounted on drive shaft 206 and is received inside opening 208 of the claw 200. The spring 202 urges the portion 208 of the claw 200 into engagement with the eccentric 204, and as the shaft 206 rotates the left-hand end of the claw 200, in which the eccentric 204 is received, is moved laterally and swung from side to side, thereby causing the claw to carry out its film-feeding functions, all as is well known. For each complete rotation of the shaft 206 and the eccentric 204, the claw 200 will complete a single feeding cycle, moving from a withdrawn position to a position in which it penetrates the sprocket holes 12 on the film 8, draws that film down a distance corresponding to a single frame 14, and then withdraws from the sprocket holes 12 so as to leave the film stationary.

The mechanism to inhibit the operation of the claw 200 through its film-feeding cycle while at the same time permitting the drive shaft 206 to rotate comprises a pin 210, connected to and movable with the claw 200, that pin passing through slot 212 in stationary frame plate 214 and then being connected to member 216, the latter being slidably retained on the plate 214 by means of screws 218 received in slots 220 formed in the member 216. The member 216 extends forwardly and is then bent to one side, at 222. The laterally bent portion 222 will, therefore, move back and forth with the claw 200 as the latter moves.

The electromagnet 82', of which the winding 82 of FIG. 3 is a part, is mounted on the chassis at a point near the path of movement of the part 222. That electromagnet comprises an armature 224 which is spring-urged downwardly but which is adapted to be pulled upwardly and inwardly by the winding 82 when the latter is energized. Spring 226 is active on the armature 224 to urge it downwardly, as by engaging pin 228 carried by the armature 224. The lower end of the armature 224 carries an enlargement 230 which, when the armature 224 is in its down position, is in the path of movement of the part 222. When the part 222 together with the claw 200 is in its fully withdrawn position all the way to the left as viewed in FIG. 6, the enlargement 230 can move downwardly in front of the part 222, and thereafter as the eccentric 204 rotates to permit the claw 200 and the part 222, as urged by the spring 202, to move to the right in FIG. 6, the part 222 will come up against the part 230 and will be prevented from moving. This will prevent the claw 200 from moving and thus will prevent any feed of the film 8. The shaft 206 may rotate the eccentric 204, merely moving away from the claw part 208 in which it is received. When the winding 82 is energized and the armature 224 is pulled upwardly, the enlargement 230 is moved up out of the path of movement of the part 222, thus permitting the part to move to the left as viewed in FIG. 5 (to the right as viewed in FIG. 6) as permitted by rotation of the eccentric 204 within the claw part 208, thereby producing a single frame feed of the film 8. If, as is preferably the case, the winding 82 is deenergized during the feed cycle of the claw 200, the armature 224 will be released for downward movement, the enlargement 230 will engage the upper surface of the part 222 without inhibiting lateral sliding movement of part 222, and it will be retained in its thus elevated position until the part 222 has moved all the way to the right as viewed in FIG. 5, as it will do at the end of its feed cycle. Then the enlargement 230 will move down into the path of the part 222, preventing any further feed of the film 8 unless and until the solenoid winding 82 is energized.

If the claw 200 were released when the feed mechanism per se — the eccentric 204 mounted on shaft 206 — was in a position corresponding to penetration of the film by the claw 200, with the claw then being someplace within its range of film-feeding movement, the claw 200 would be released to assume that position. It might or might not engage with the sprocket holes in the film. If it does not thus engage, the film might not be fed at all. If it does thus engage, the film will be fed, but for a distance less than that corresponding to a full frame. In either case, the projection will be faulty. It is to prevent this from occurring that the switch 114, 116 is provided, that switch being operated by cam 118 (shown schematically in FIG. 3 and physically in FIG. 5). The timing of the cam action on the switch 114, 116 is such that the switch 114, 116 is closed only during the time that the cam 204 is in the claw-withdrawal-and-return portion of its cycle movement. Hence the solenoid 82 will be energized withdrawing the enlargement 230 from the path of the part 222 a short time before the feeding cam 204 permits the claw 200 to move forward and penetrate the film. Hence registration of the claw with the film sprocket openings and the feeding of the film one complete frame distance by the claw is ensured.

SUMMARY

The system and structure of the present invention has been here disclosed in a preferred form, and the operation of the control system has been described in conjunction with what are considered to be preferred modes of operation. However, it will be apparent that, precisely because the system of the present invention permits such a degree of flexibility in the type of control achieved, that which is here specifically disclosed must be considered as exemplary only. Similarly, although a given relatively conventional feeding structure has been here disclosed, with means shown to modify it for functioning in conjunction with the system of the present invention, that too is subject to wide variation and the specific disclosure here must be considered as exemplary only.

The terms "optical displayer" and "sound reproducer" are here used, in the specification and in the claims, generically to means first and second intelligence reproducing devices of whatsoever character the control of which is to be interrelated. They could both reproduce sound, they could both display visual images, or, if one is optical and the other aural, the sequence of control steps could be such that the terms "optical displayer" and "reproducer device," if interpreted literally, could be interchanged in the specification and claims while still incorporating the invention here disclosed and claimed.

While only a single embodiment of the present invention has been here specifically disclosed, it will be apparent that many variations may be made therein, all within the scope of the instant invention as defined in the following claims.

We claim:

1. A feeding mechanism for a displayer comprising a member movable between first and second operative positions, biasing means urging said member toward said first position, and a drive element engaging said member, moving it to its second position and permitting it to move to its first position, a part connected to said member and movable therewith, a stop movable between first and second positions, said stop when in its first position being in the path of movement of said part and being engaged by said part when the latter is in its second position, said stop when in its second position being out of the path of movement of said part, biasing means acting on said stop to urge it to its first position, and electrically actuated stop moving means operatively connected to said stop and effective when actuated to move said stop to its second position.

2. The feeding mechanism of claim 1, in which said member is adapted to move from first to second position and back again in a given period of time, and means operatively connected to said stop moving means for actuating the latter for a period of time less than said given period of time.

3. The feed mechanism of claim 2, in which said member is movable through feed and return cycles, and interlock means operatively connected to said member and to said stop moving means and effective to permit actuation of the latter only when said member is in its return cycle.

4. The feed mechanism of claim 1, in which said member is movable through feed and return cycles, and interlock means operatively connected to said member and to said stop moving means and effective to permit actuation of the latter only when said member is in its return cycle.

5. The feeding mechanism of claim 1, in which stop moving means comprises an electromagnet.

6. The feed mechanism of claim 5, in which said member is movable through feed and return cycles, and interlock means operatively connected to said member and to said stop moving means and effective to permit actuation of the latter only when said member is in its return cycle.

7. The feeding mechanism of claim 5, in which the means for actuating said stop moving means comprises an energy source, an energy storage means and switch means effective alternately to connect said storage means to said source and to said electromagnet.

8. The feeding mechanism of claim 7, in which said member is adapted to move from first to second position and back again in a given period of time, said energy storage means when connected to said electromagnet being effective to actuate the latter for a period of time less than said given period of time.

9. The feeding mechanism of claim 1, in which the means for actuating said stop moving means comprises an energy source, an energy storage means and switch means effective alternately to connect said storage means to said source and to said electromagnet.

10. The feeding mechanism of claim 9, in which said member is adapted to move from first to second position and back again in a given period of time, said energy storage means when connected to said electromagnet being effective to actuate the latter for a period of time less than said given period of time.

* * * * *